United States Patent Office 2,793,233
Patented May 21, 1957

2,793,233
HORMONE INTERMEDIATE AND PRODUCTION THEREOF

Gilbert J. Stork, Leonia, N. J., assignor to Research Corporation, New York, N. Y., a corporation of New York No Drawing. Application March 26, 1954, Serial No. 424,794

5 Claims. (Cl. 260—586)

This invention relates to methods for the production of steroids, particularly cortical hormones, such as cortisone, and to novel intermediate compounds useful in the production of such substances.

The principles of the invention will be described with reference to the following reaction diagram in which the angular methyl groups are indicated conventionally by a line projecting from the angular carbon atom.

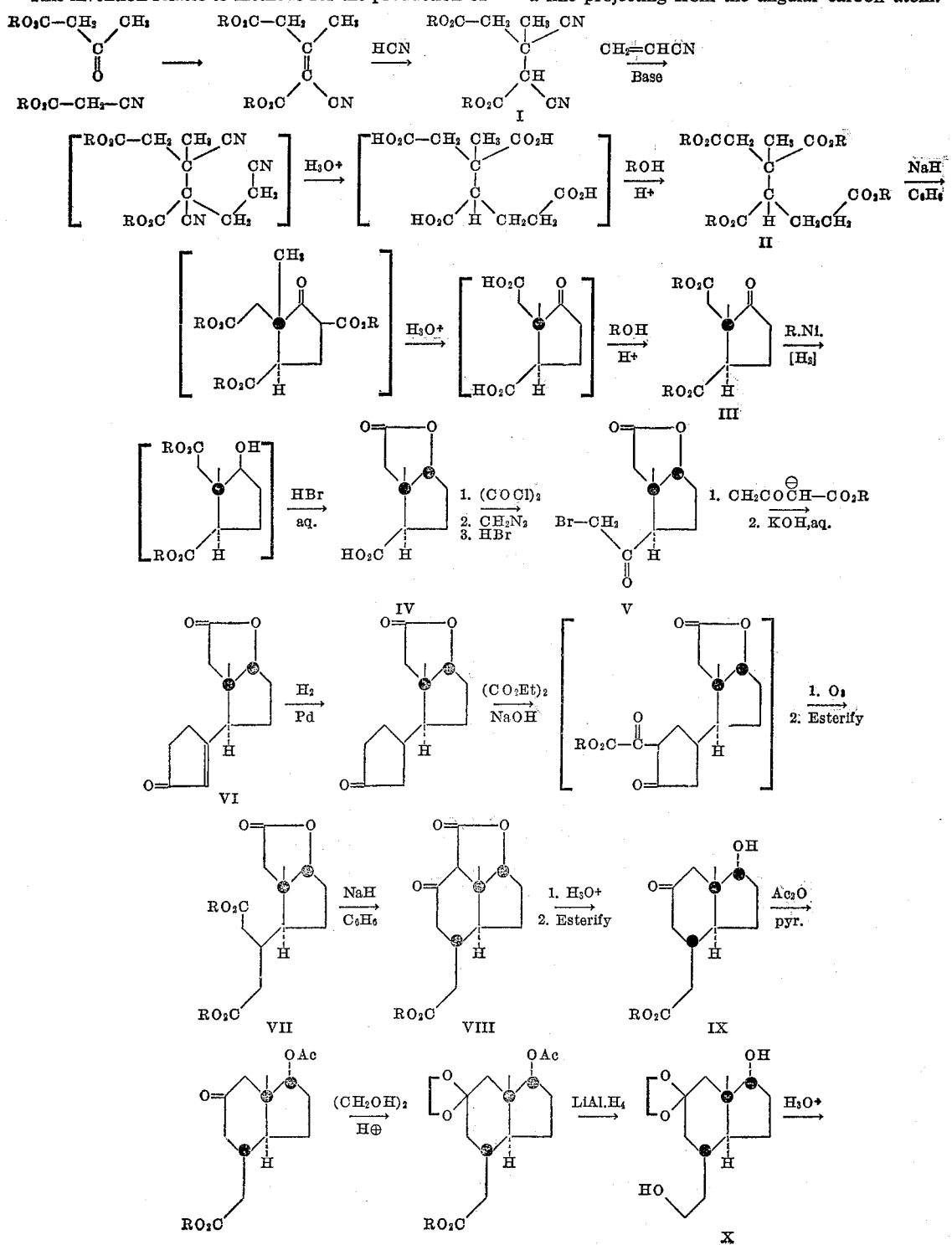

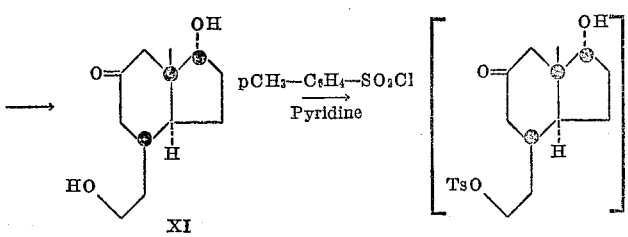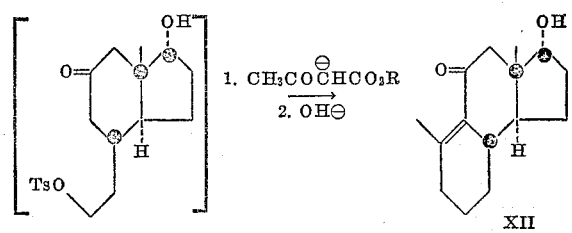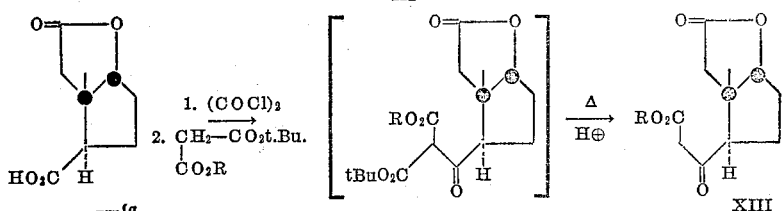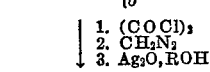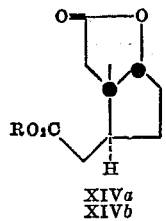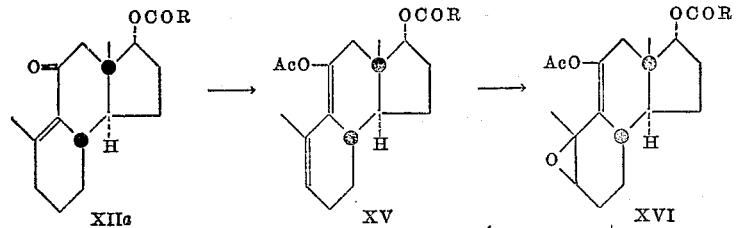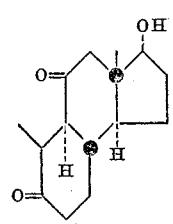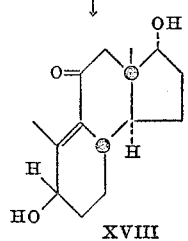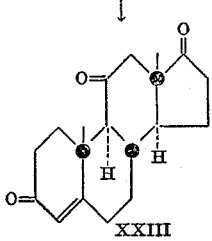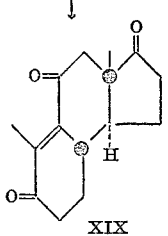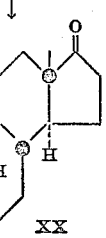

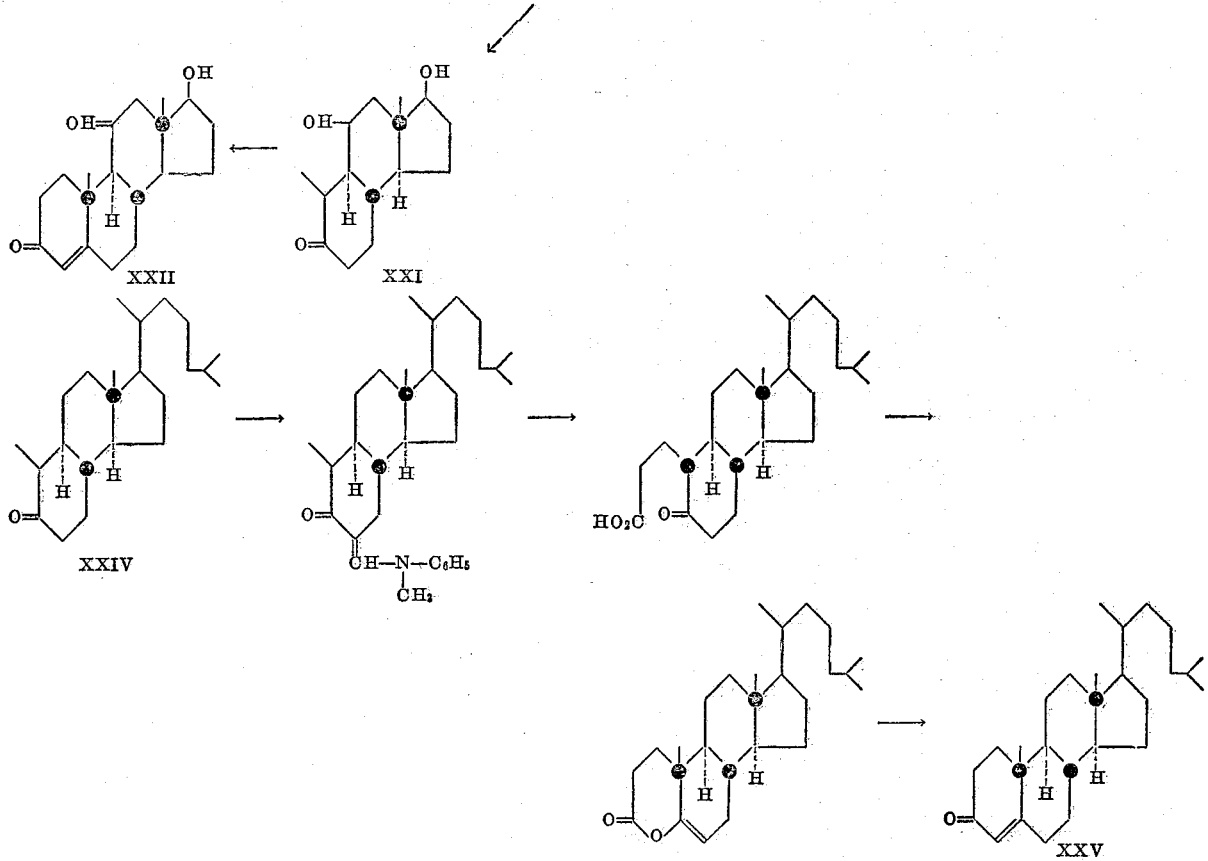

The methods of the invention start with the known ester of 2-methyl-2,3-dicyanopropane-1,3-dicarboxylic acid (I), which may be made by the condensation of acetoacetic ester with cyanoacetic ester followed by the addition of HCN to the condensation product.

The dicyano ester (I) is condensed with acrylonitrile to the ester of 2-methyl-2,3,5-tricyanopentane-1,3-dicarboxylic acid which is hydrolyzed and decarboxylated to 2-methylpentane-1,2,3,5-tetracarboxylic acid. The latter is esterified to (II).

The tetracarboxylic acid ester (II) is condensed to the ester of 2-methyl-2-carboxymethylcyclopentanone-3,5-dicarboxylic acid, which is hydrolyzed and decarboxylated to 2-methyl-2-carboxymethylcyclopentanone-3-carboxylic acid. The latter is esterified to the diester (III).

The cyclopentanone ester (III) is reduced to the corresponding pentanol which is converted by acid hydrolysis to the lactone of 2-methyl-2-carboxymethylcyclopentanol-3-carboxylic acid (IV).

The lactonic acid is converted to the acid chloride, the latter is converted by reaction with diazomethane to the lactone of 2-methyl-2-carboxymethyl-3-diazoacetylcyclopentanol, and the diazoacetyl compound is converted to the corresponding bromoketone (V) with strong hydrobromic acid.

Condensation of the bromoketone (V) with sodioacetoacetic ester followed by alkaline hydrolysis gives the lactone of 2-methyl-2-carboxymethyl-3-(3-1-keto-$\Delta^2$-cyclopentyl) cyclopentanol (VI).

The cyclopentenone (VI) is hydrogenated to the corresponding cyclopentanone and the latter is condensed with ethyl oxalate to the 4-oxalyl derivative which on ozonization and esterification gives the lactone of 3-hydroxy-2-methylcyclopentane-2-acetic-1-$\beta$-glutaric acid ester (VII).

The lactonic glutaric ester (VII) is cyclized with sodium hydride in benzene to the lactone of 1-hydroxy-6-keto-7-carboxy-8-methylhydrindane-4-acetic acid ester (VIII).

The hydroxyketo ester (VIII) is hydrolyzed and decarboxylated at 7 by boiling with dilute acid and the product esterified to 1-hydroxy-6-keto-8-methylhydrindane-4-acetic acid ester (IX).

The 1-hydroxyl group is esterified with acetic anhydride and the acetyl derivative is converted to the 6-ethylene ketal by refluxing with ethylene glycol. The ketal acetate is reduced to the ethylene ketal of 1-hydroxy-4-$\beta$-hydroxyethyl-8-methyl-hydrindanone-6 (X) with lithium aluminum hydride.

The ketal diol (X) is deketalized by acid hydrolysis to 1-hydroxy-4-$\beta$-hydroxyethyl-8-methylhydrindanone-6 (XI) and the $\beta$-hydroxyl is esterified with an aryl sulfonic acid. The ester is then condensed with acetoacetic ester and the condensate hydrolyzed in alkali to give 2,3,3a,7,8,9,9a,9b-octahydro-3-hydroxy-3a,6-dimethyl-1-benz[e]inden-5(4)-one (XII).

The lactone of 2-methyl-2-carboxymethylcyclopentanol-3-carboxylic acid (IV) may also be converted into the lactone of 2-methyl-2-carboxy-methyl-3-($\beta$-keto propionic acid ester)-cyclopentanol (XIII) by condensing the acid chloride with t-butyl ethyl malonate, and decarboxylating the condensation product, or it may be converted into the lactone of 2-methyl-2,3-di(carboxymethyl)cyclopentanol (XIV) by converting the acid chloride into the 3-diazoacetyl compound with diazomethane and treating with silver oxide.

Typical methods and compounds of the invention are more particularly described in the following illustrative examples:

*Diethyl ester of 2-methyl-2,3-dicyanopropane-1,3-dicarboxylic acid (I).*—A mixture of acetoacetic ester (128 g.), cyanoacetic ester (130 g.), glacial acetic acid (60 cc.), ammonium acetate (15 g.) and benzene (300 cc.) is refluxed until the separation of water is complete. The light-yellow reaction mixture is washed with water three times and the solvents are removed in vacuum on a steam bath. The residue is dissolved in 95% alcohol (1050 cc.) and to this is added a solution of potassium cyanide (112 g. or equivalent of sodium cyanide) in ice water (200 cc.+400 g. ice). The mixture is kept cool with crushed ice. Next concentrated hydrochloric acid (140 g.) in ice water (200 cc.+400 g. ice) is added with cooling. After standing at room temperature for 20 minutes the mixture is poured into ice-cold dilute hydrochloric acid containing 250 cc. concentrated hydrochloric acid. The reaction mixture is then extracted with ether or chloroform, dried and distilled. The dicyano ester (I) passes over at 173–75° C./9 mm. or 145–50° C./1 mm.

*Tetramethyl ester of 2-methylpentane-1,2,3,5-tetracarboxylic acid (II).*—2 g. of K is dissolved in dry t-butyl alcohol (300 cc.) and to this, with cooling, is added the above dicyano ester (I) (280 g.), followed by 80 g. of acrylonitrile. The yellowish solution is allowed to stand overnight. It is then acidified with concentrated HCl (6 cc.) followed by anhydrous sodium acetate (2 g.) and the t-butyl alcohol is removed in vacuum on the water bath. The residue is mixed with concentrated HCl (2 lbs.) and allowed to stand for two days, then refluxed for two days. A portion of the solution is evaporated off and fresh concentrated HCl (1.5 lbs.) is added and refluxed for 2 days more. Finally, the solution is evaporated to dryness under suction and the residue is esterified with an excess of methanol containing 20% sulphuric acid and the tetramethyl ester (II) is isolated (B. P. 160–65° C./1 mm.).

*Diethyl ester of 2-methyl-2-carboxymethylcyclopentanone-3-carboxylic acid (III).*—100 g. of the tetramethyl ester (II) is mixed with dry benzene (1000 cc.), sodium hydride (14.5 g.), methanol (3 cc.) and refluxed under nitrogen for 1½ hours. It is then cooled and decomposed with dilute ice-cold hydrochloric acid. The benzene layer is separated, the benzene is removed, and the residue is hydrolyzed by boiling with 3 volumes of dilute hydrochloric acid (2:1) for 12 hours. The solution is evaporated and finally esterified with a mixture of alcohol (400 cc.) and sulphuric acid (45 cc.) for 20 hours on the water bath. The reaction mixture is worked up and the ketodiester (III) is obtained. (B. P.: 130° C./1 mm.).

*2 - methyl - 2 - carboxymethylcyclopentanol - 3 - carboxylic acid lactone (IV).*—The cyclopentanone ester (III) (50 g.) is reduced in alcohol solution with Raney nickel at 140–150° C. under 100 atm. of hydrogen. The product is hydrolyzed with a mixture of acetic acid (300 cc.) and concentrated HCl (100 cc.) for 12 hours. The solution is evaporated to dryness, the residue is refluxed for 2 hours with 48% hydrobromic acid (200 cc.), and the solution is evaporated again under water suction. The pasty residue is diluted with water (75 cc.) and the solution is extracted with chloroform three times. The aqueous portion is evaporated to recover any unreduced ketoacid. The chloroform solution is evaporated, and finally the lactonic acid (IV) is isolated by distillation (bath temp.—200–205° C., pressure 1 mm.). The gummy residue solidifies on scratching in the presence of ether and is filtered; M. P. 93–97° C. After crystallization from ethyl acetate it melts at 98–100° C. This is a mixture of cis and trans lactonic acids, in which the amount of cis isomer varies from 10–15%. The pure trans isomer (IVa) melts at 102–03° C. The pure (IVb) cis isomer melts at 131–133° C.

*2 - methyl-2-carboxymethyl-3-bromoacetylcyclopentanol lacton (V).*—10 g. of the lactonic acid (IV) is converted into the acid chloride with 15 g. oxalyl chloride and heated in ether with diazomethane from nitrosomethylurea (50 g.). The diazoketone in ether is treated with 48% HBr (50 cc.) and allowed to stand overnight. The ether solution is worked up, washed with dilute Na₂CO₃ solution, and the diluted HBr solution is extracted with CHCl₃. From the ether and chloroform fractions the bromoketone (V) is obtained as light-yellow crystals.

*2 - methyl-2-carboxymethyl-3-(3-1-keto-Δ²-cyclopentenyl)cyclopentanol lactone (VI).*—The bromoketone (V) is dissolved in benzene and added to an ice-cold ethereal suspension of sodioacetoacetic ester from acetoacetic ester (15 g.) and NaH (1.6 g.). The mixture is allowed to stand overnight, then refluxed for 5 hours on the water bath and worked up. Excess acetoacetic ester is removed in vacuum. The residual oil is suspended in water (1200 cc.), the solution is heated to boiling, and a solution of KOH (20 g.) in water (1300 cc.) is added in 10 minutes. The solution is refluxed for 2 hours. KOH (44 g.) in water (400 cc.) is added and refluxing was continued for another 12 hours under N₂ atmosphere throughout the reaction. (With larger amounts of lactonic acid the refluxing should be prolonged by another 12 hours, after adding another 90 ml. of 10% KOH solution, in order to isomerize the cis ketone from the cis lactonic acid to the trans ketone.

This isomerization makes the separation of the cis and trans lactonic acids unnecessary at the earlier stage). The mixture is cooled and acidified with concentrated HCl (140 cc.), saturated with sodium chloride and extracted with CHCl₃ four times (total volume—700 cc.). The CHCl₃ solution is washed with Na₂CO₃ solution, washed with water, dilute HCl, water, and finally the chloroform is removed in vacuum. The residual heavy oil solidifies on scratching in presence of ethyl acetate. After recrystallization from ethyl acetate, the cyclopentanone (VI) melts at 153–54° C.

*Lactone of 3 - hydroxy-2-methylcyclopentane-2-acetic-1-β-glutaric acid ester (VII).*—13.5 g. of the cyclopentenone (VI) is reduced in alcohol solution with 10% Pd/C and the crude product is condensed at —5° C. with ethyl oxalate (20 cc.) in the presence of sodium ethoxide, from sodium (1.6 g.) and alcohol (25 cc.), by allowing it to stand overnight. The residue obtained after working up is dissolved in ethyl acetate (200 cc.) and ozonized in 100 cc. lots at —50° C. The ozonide is decomposed by adding dropwise to boiling water. On cooling, a small amount of gummy material separates and is removed with CHCl₃. The aqueous solution is evaporated to dryness and the acid is isolated as the methyl ester (VII); (M. P. 48–50° C., B. P. (bath temp.)= 200–10° C., pressure=.4 mm.; free acid, crystallized from ethyl acetate, M. P. 154–56° C.).

*Lactone of 1-hydroxy-6-keto-7-carboxy - 8 - methylhydrindane-4-acetic acid ester (VIII).*—The lactonic glutaric ester (VII) (4.9 g.) is cyclized with .8 g. NaH, .2 cc. MeOH and 50 cc. C₆H₆ by refluxing under N₂ for 1½ hours. (Na-salt separates as a jelly). The mixture is cooled in ice and decomposed with dilute HCl; the crystals are filtered, the benzene solution is diluted with ether and the crystals are collected. On crystallization from ethyl acetate (VIII) melts at 141–142° C. (Dinitrophenylhydrazone—yellow crystals—M. P. 223–224° C.). From the benzene mother liquors .7 g. of the glutaric ester is recovered.

*1-hydroxy-6-keto-8-methylhydrindane-4-acetic acid ester (IX).*—2 g. of the keto lactonic ester (VIII) is hydrolyzed and decarboxylated at position 7 by boiling with water (20 cc.) containing 1 cc. of concentrated HCl for 24 hours; the solution is evaporated and the residue esterified. The methyl ester (IX) boils at 180–185° C. (bath temp.) pressure .5 mm.—(3,5-dinitrobenzoate, from alcohol, M. P. 122–23° C.; semicarbazone—M. P. 198–200° C.).

*Ethylene ketal of 1-hydroxy-4-β-hydroxyethyl-8-methylhydrindanone-6 (X).*—1 g. of the hydroxy keto ester (IX) is refluxed with Ac₂O (10 cc.) and pyridine (10 cc.) for 1½ hours, the low boiling products are removed under water suction and finally the acetyl derivative is obtained (B. P. 180–85° C. (bath temp.) pressure=.3 mm.). 3 g. of the acetyl compound is converted into the ethylene ketal by refluxing under a water separator with ethylene glycol (1 g.), benzene (15 cc.) and a pinch of p-toluene sulphonic acid (B. P. 185–95° C. (bath temp.) at .7 mm. pressure). 1.7 g. of the ketal acetate is reduced with LiAlH₄ (6 g.) in tetrahydrofuran (15 cc.) by refluxing on the water bath for 20 minutes and decomposed with a minimum amount of water and then a few drops of concentrated KOH solution. The precipitated alumina is extracted with tetrahydrofuran and the combined tetrahydrofuran solutions are dried with $MgSO_4$. The solvent is removed and the residue is distilled. The distillate solidifies on long standing. On crystallization from alcohol the ketal diol (X) melts at 114–15° C. (yield 1.2 g.).

*1-hydroxy-4-β-hydroxyethyl-8-methylhydrindanone-6 (XI).*—The ketal diol (X) (4.5 g.) is deketalized by boiling 24 hours with water (30 cc.) containing 2 cc. of concentrated HCl and enough dioxane to bring in solution, and the keto-diol (XI) is isolated by evaporation and distillation. (Di-p-nitrobenzoate from ethyl acetate—M. P. 198–99° C.).

*2,3,3a,7,8,9,9a,9b-octahydro-3-hydroxy-3a,6-dimethyl-1-benz[e]inden-5(4)-one (XII).*—1.5 g. of the crude keto-diol (XI) is dissolved in dry pyridine, cooled thoroughly to 0° C. and p-tolylsulphonyl chloride (1.35 g.) added. After ½ hour at 0° C. the mixture is left at room temperature for 1 hour and then poured into ice/HCl thoroughly extracted with $CHCl_3$, dried and the solvent is removed. Crude residue of tosylate: 2.2 g. This is condensed with acetoacetic ester (10 cc.), potassium (1.5 g.) and t-butyl alcohol (35 cc.) by refluxing for 2 days ($N_2$). The mixture is acidified and extracted with ether. The solvent is distilled off and excess acetoacetic ester is removed by distillation. The crude residue is hydrolyzed with KOH (6 g.), $H_2O$ (270 cc.) and dioxane (90 cc.) under reflux ($N_2$) for 2 hours when a solution of KOH (12 g.) in $H_2O$ (30 cc.) is added and the mixture is refluxed overnight. The solution is then acidified with acetic acid, evaporated, extracted with ether, washed with dilute sodium hydroxide solution and the solvent is removed. The crude hydroxy tricyclic ketone (XII) is converted into the p-nitrobenzoate by treating with p-nitrobenzoyl chloride (3 g.) in pyridine (10 cc.), heating on the water bath for a few minutes, and allowing to stand overnight. The solution is then poured into ice/HCl and extracted with $C_6H_6$. The solution is concentrated and purified by passing through a column of $Al_2O_3$ (30 g.). The benzene eluate gives a light yellow oil which solidifies—M. P. ca. 130° C. After two crystallizations from alcohol the tricyclic ketone p-nitrobenzoate melts at 152–153° C.

*2-methyl-2-carboxymethyl-3-(β-keto propionic acid ester) lactone (XIII).*—The acid chloride obtained as above from the lactonic acid (IV) is condensed with t-butyl ethyl malonate (25 g.) in the presence of NaH (2.6 g.) in benzene (60 cc.). After standing overnight the mixture is refluxed for ½ hour, decomposed with acetic acid, filtered, and the benzene is removed on the water bath, finally in vacuum. Next benzene (30 cc.) and p-toluene sulphonic acid (1 g.) are added and the mixture is refluxed on the water bath for 2 hours. The mixture is poured into water, washed with $Na_2CO_3$ solution, dried and distilled. The fraction boiling at 185–90° C./1 mm. is collected. ($FeCl_3$ color=wine-red).

*2-methyl-2,3-di(carboxymethyl)cyclopentanol lactone (XIV).*—6.2 g. of lactonic acid (IV) (cis or trans) is converted into the acid chloride and heated with $CH_2N_2$ from 30 g. of nitrosomethylurea. The diazoketone is dissolved in methanol (125 cc.) and treated with $Ag_2O$ from 1.5 g. of $AgNO_3$. The homo-methyl ester (XIV, $R=CH_3$) is isolated boiling at 150–55° C./2 mm. The pure trans-homoacid (XIVa, R=H) melts at 110–11° C. The pure cis-homoacid (XIVb, R=H) melts at 132–33° C.

The following conversions are illustrative of the usefulness of substance XII for the synthesis of adrenal hormones:

*Enol acetate of 2,3,3a,7,8,9,9a,9b-octahydro-3-hydroxy-3a,6-dimethyl-1-benz[e]inden-5(4)-one p-nitrobenzoate (XV).*—1 g. of the tricyclic ketone p-nitrobenzoate (XIIa) was converted into its enol acetate upon refluxing under nitrogen for five hours with a mixture of 5 ml. acetic anhydride and 5 ml. acetyl chloride. After removal of the low boiling material at 100° C. in high vacuum the crude XV remained and could be used directly for the next step.

*2,3,3a,5a,8,9,9a,9b-octahydro-3-hydroxy-3a,6-dimethyl-1-benz[e]inden-5(4), 7(6)-dione (XVII).*—The crude enol acetate obtained above was dissolved in 25 ml. of benzene and was treated with 4 ml. of an ether solution of monoperphthalic acid containing 4.2 g. active oxygen per liter. After two days in the cold and one day at room temperature the precipitated phthalic acid was removed and the solution was evaporated after washing with sodium bicarbonate solution and drying over sodium sulfate. The residue, consisting mostly of the epoxide (XVI), obtained after removal of the ether was then refluxed with a solution of 6 ml. of methanol and 2 ml. concentrated hydrochloric acid for 3 hours, under a nitrogen atmosphere. The low boiling substances were removed on the steam bath under vacuum leaving behind the desired XVII which was characterized as its p-nitro-benzoate M. P. 191–192° C. after crystallization from alcohol.

*1,3a,9,9a,9b pentahydro-3a, 6-dimethyl-1-benz[e]inden-3(2), 5(4), 7(8)-trione (XIX).*—The crude epoxide (XVI) obtained as described in the previous experiment was refluxed under nitrogen for one hour with a solution of 2.5 g. of potassium carbonate in 75 ml. of methanol and 25 ml. of water. After dilution with water and extraction with ether the crude dihydroxy ketone (XVIII) was obtained and was oxidized directly to the desired XIX by dissolving in 10 ml. of benzene and adding a solution of 2.5 g. of sodium dichromate in 30 ml. of acetic acid at 12° C. After standing overnight at room temperature, the solution was poured onto ice and KOH solution and extracted with ether. Removal of the ether left the unsaturated triketone as a crystalline solid, M. P. 145–146° C. after recrystallization from alcohol.

*1,3a,5a,6,9,9a,9b heptahydro-3a, 6-dimethyl-1-benz[e]-inden-3(2), 5(4), 7(6)-trione (XX).*—A solution of 300 mg. of crystalline unsaturated triketone (XIX) in 25 ml. of acetic acid was heated for 4 hours on the steam bath with 2 g. of zinc dust. After removal of the zinc the solution was diluted with water, extracted with ether and the ether extracts, after washing with base to remove the acetic acid, were concentrated and distilled evaporatively at 1 mm. at a bath temperature of 160–170° C. The distillate was chromatographed on alumina and eluted with 1:1 petroleum ether-benzene, yielding stout crystals of the trione (XX), M. P. 142–143° C.

The path from compounds such as either XVII or XX to the adrenal steroids is well known and the general method by which ring A may be built on to the BCD system of XVII and XX is illustrated, for instance, by the conversion of Inhoffen's ketone (XXIV) to cholestenone (XXV).

The various steps in this transformation have been described, for instance, by Pinder and Robinson, J. Chem. Soc., 1224 (1952); by Turner, J. Am. Chem. Soc., 72, 579 (1950); and by Fujimoto, J. Am. Chem. Soc., 73, 1856 (1951).

The addition of ring A by this method to XVII leads to adrenosterone XXIII, and the procedure applied to XX leads to 11-hydroxy-testosterone XXII.

This application is a continuation-in-part of my application Serial No. 271,639 filed February 14, 1952, now abandoned.

I claim:

1. The method which comprises condensing 1-hydroxy-4-β-hydroxyethyl-8-methylhydrindanone-6 esterified at the β-hydroxyl with a monocyclic aryl hydrocarbon sulphonic acid with acetoacetic ester, hydrolyzing the condensation product with an aqueous alkali and recovering the 2,3,3a,7,8,9,9a,9b-octahydro-3-hydroxy-3a, 6-dimethyl-1-benz[e]inden-5(4)-one thereby produced.

2. The method which comprises acylating the 1-hydroxyl of a 1-hydroxy-6-keto-8-methylhydrindane-4-acetic acid alkyl ester, ketalizing the 6-keto with ethylene glycol, reducing the ester group to a hydroxyl, hydrolyzing the ketal to the corresponding ketone, esterifying the β-hydroxyl with a monocyclic aryl hydrocarbon sulphonic acid, condensing the ester with acetoacetic ester, hydrolyzing the condensation product with an aqueous alkali and recovering the 2,3,3a,7,8,9,9a,9b-octahydro-3-hydroxy-3a, 6-dimethyl-1-benz[e]inden-5(4)-one thereby produced.

3. In the production of 2,3,3a,7,8,9,9a,9b-octahydro-3-hydroxy-3a,6-dimethyl-1-benz[e]inden-5(4)-one, the step which comprises condensing 1-hydroxy-4-β-hydroxyethyl-8-methylhydrindanone-6 esterified at the β-hydroxyl with a monocyclic aryl hydrocarbon sulphonic acid with acetoacetic ester.

4. In the production of 2,3,3a,7,8,9,9a,9b-octahydro-3-hydroxy-3a,6-dimethyl-1-benz[e]inden - 5(4) - one, the step which comprises condensing 1-hydroxy-4-β-tosyloxyethyl-8-methylhydrindanone-6 with acetoacetic ester.

5. 2,3,3a,7,8,9,9a,9b-octahydro-3-hydroxy-3a,6-dimethyl-1-benz[e]inden-5(4)-one having the structural formula

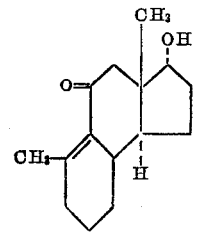

No references cited.